(12) United States Patent (10) Patent No.: US 8,862,604 B2
Jin et al. (45) Date of Patent: *Oct. 14, 2014

(54) METHOD AND APPARATUS OF ORDERING SEARCH RESULTS

(71) Applicant: Alibaba Group Holding Limited, Grand Cayman, KY (US)

(72) Inventors: Huaxing Jin, Hangzhou (CN); Wei Zheng, Hangzhou (CN); Peng Huang, Hangzhou (CN); Xu Yang, Hangzhou (CN); Feng Lin, Hangzhou (CN); Jiong Feng, Hangzhou (CN); Qin Zhang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 13/961,390

(22) Filed: Aug. 7, 2013

(65) Prior Publication Data

US 2013/0325857 A1 Dec. 5, 2013

Related U.S. Application Data

(63) Continuation of application No. 13/381,069, filed as application No. PCT/US2011/053290 on Sep. 26, 2011, now Pat. No. 8,538,975.

(30) Foreign Application Priority Data

Sep. 28, 2010 (CN) .......................... 2010 1 0299100

(51) Int. Cl.
*G06F 7/00* (2006.01)
*G06F 17/30* (2006.01)

(52) U.S. Cl.
CPC ...... *G06F 17/30964* (2013.01); *G06F 17/3053* (2013.01)
USPC ....................................................... 707/758

(58) Field of Classification Search
CPC .............. G06F 17/30; G06F 17/30386; G06F 17/30011; G06F 17/30241; G06F 17/30867; G06F 17/30106; G06F 17/30864; G06F 17/30283; G06F 17/30595; G06F 17/30017; G06F 17/30026; G06F 17/30029
USPC .................................................. 707/758, 648
See application file for complete search history.

(56) References Cited

U.S. PATENT DOCUMENTS 7,287,012 B2 10/2007 Corston et al.
7,664,744 B2 2/2010 Guha (Continued)

OTHER PUBLICATIONS

U.S. Appl. No. 13/381,069, filed Dec. 27, 2011, Huaxing Jin et al., "Method and Apparatus of Ordering Search Results," 35 pages.

(Continued)

*Primary Examiner* — Truong Vo
(74) *Attorney, Agent, or Firm* — Lee & Hayes, PLLC

(57) ABSTRACT

Ordering search results may include obtaining an exposed log file from a log system, computing a Bayesian posterior probability for relevancy between the log file and a search request, computing an expected value of the relevancy between the log file and the search request based on the Bayesian posterior probability, storing the search request and an identifier of the log file as a key and the expected value of the relevancy between the log file and the search request as a value into a search data structure, in response to receiving a search request submitted by a user, finding expected values of relevancy between the submitted search request and log files that are relevant to the submitted search request from the search data structure, and ordering the found log files in a descending order of the expected values.

16 Claims, 9 Drawing Sheets

(56) References Cited

U.S. PATENT DOCUMENTS

| | | |
|---|---|---|
| 7,689,615 B2 | 3/2010 | Burges et al. |
| 7,761,447 B2 | 7/2010 | Brill et al. |
| 8,015,063 B2 | 9/2011 | Meisel et al. |
| 8,019,744 B1 | 9/2011 | Roizen et al. |
| 2006/0064411 A1 | 3/2006 | Gross et al. |
| 2007/0214131 A1 | 9/2007 | Cucerzan et al. |
| 2007/0294220 A1 | 12/2007 | Tabraham |
| 2009/0198674 A1 | 8/2009 | Custis et al. |
| 2009/0228437 A1 | 9/2009 | Narayanan et al. |
| 2010/0082566 A1 | 4/2010 | Wang et al. |
| 2010/0082614 A1 | 4/2010 | Yang et al. |
| 2010/0125570 A1 | 5/2010 | Chapelle et al. |
| 2010/0138410 A1 | 6/2010 | Liu et al. |
| 2010/0205172 A1 | 8/2010 | Luk |

OTHER PUBLICATIONS

PCT Search Report and Written Opinion mailed Dec. 16, 2011 for PCT application No. PCT/US11/53290, 9 pages.

Chinese Office Action mailed Jan. 5, 2013, for Chinese patent application No. 201010299100.0, a counterpart foreign applicaton of U.S. Appl. No. 13/961,390, 11 pages.

METHOD AND APPARATUS OF ORDERING SEARCH RESULTS

CROSS REFERENCE TO RELATED PATENT APPLICATIONS

This application is a continuation of and claims priority to U.S. patent application Ser. No. 13/381,069, filed on Dec. 27, 2011, which claims priority to a national stage application of an international patent application PCT/US11/53290, filed Sep. 26, 2011, which claims priority to Chinese Patent Application No. 201010299100.0, filed Sep. 28, 2010, entitled "Method and Apparatus of Ordering Search Results," which applications are hereby incorporated in their entirety by reference.

TECHNICAL FIELD

The present disclosure relates to the fields of communication and computer technologies, and particularly, relates to methods and apparatuses of ordering search results.

BACKGROUND OF THE DISCLOSURE

After a user submits a search request to a search engine, the search engine retrieves a large amount of information that is relevant to the search request of the user. The search engine further orders the information based on a degree of relevancy between each piece of information and the search request to allow the user to quickly find his/her most desired information through the search engine.

Nowadays, search engines mostly use CTR (Click-Through-Rate) to reflect a degree of relevancy between each piece of information and a user's search request, where CTR is the quotient between a click rate and an exposure rate of the information. Upon computing the CTR of each piece of information, the search engine orders the information in a search result list in a descending order of the CTR.

During the study, inventors of this patent application, however, have noted that the degree of relevancy between a piece of information and a user search request is often related to the position of that piece of information in a search result list and the click sequence associated with the search result list. For example, CTR of information located in different positions may not be the same even though respective relevancies are the same in a same search result page. Alternatively, information that has been clicked by a user may influence the probability of clicking subsequent information.

Nevertheless, existing technology only considers click rates and exposure rates of information during the ranking process of search results, but fails to consider factors about positions of the information in the search result list and the click sequence associated with the search result list. As such, a relatively large variance exists in the relevancy scores used in the ranking process. In many cases, the information that a user desires is placed near the end of the search result list, leading to a poor search result ranking. On the other hand, when search results are poorly ranked, the user usually needs to browse and click on more information to obtain his/her most desired information. As the user "blindly" conducts extensive browsing and clicking in a website, workload of network systems, particularly, a server of the search engine, will be increased, thereby reducing the utilization rate of the network systems. The cost of the search process for the search engine server is therefore increased, wasting system resources of the search engine server.

SUMMARY OF THE DISCLOSURE

In order to solve the aforementioned problems, exemplary embodiments of the present disclosure provide a method and an apparatus of ordering search results to reduce the cost of a search process for a search engine server and save system resources of the search engine server.

In one embodiment, an exposed log file is obtained from a log system. A Bayesian posterior probability for relevancy between the log file and a search request is computed. An expected value of the relevancy between the log file and the search request is computed based on the Bayesian posterior probability. In some embodiments, the search request and an identifier of the log file are stored as a key and the expected value of the relevancy between the log file and the search request is stored as a value into a search data structure. In one embodiment, in response to receiving a search request submitted by a user, expected values of relevancy between the submitted search request and log files that are relevant to the submitted search request are found from the search data structure. In one embodiment, the found log files are ordered in a descending order of the expected values.

In some embodiments, an apparatus for ordering search results is provided. The apparatus may include an acquisition module, a probability computation module, an expected value computation module, an indexing module, a search module and an ordering module. In one embodiment, the acquisition module may obtain an exposed log file from a log system. The probability computation module may compute a Bayesian posterior probability for relevancy between the log file and a search request. In one embodiment, the expected value computation module may compute an expected value of the relevancy between the log file and the search request based on the Bayesian posterior probability. The indexing module may store the search request and an identifier of the log file as a key and the expected value of the relevancy between the log file and the search request as a value into a search data structure. In some embodiments, in response to receiving a search request submitted by a user, the search module may find expected values of relevancy between the search request submitted by the user and log files that are relevant to the submitted search request from the search data structure. In one embodiment, an ordering module may order the found log files in a descending order of the expected values.

From the above exemplary embodiments, the present disclosure considers factors about positions of information in a search result list and a click sequence associated with the search result list throughout the entire ordering process. Specifically, the disclosed method and apparatus compute expected values of relevancy between log files and search requests based on Bayesian posterior probabilities, in response to finding expected values of relevancy between a search request submitted by a user and log files that are relevant to the submitted search request from a search data structure, and order the found log files in a descending order of the found expected values. As such, the relevancy on which the ordering is based is better. Furthermore, users can use less browsing time and fewer clicks to obtain most desired information quickly, thus reducing the cost of a search process for a search engine server and saving system resources of the search engine server.

BRIEF DESCRIPTION OF THE DRAWINGS

In order to more clearly understand the technical scheme of the exemplary embodiments of the present disclosure or existing technologies, accompanying figures that are essential for explaining the exemplary embodiments or existing technologies are briefly described below. Understandably, the following figures only constitute a few exemplary embodiments of the present disclosure. Based on these accompanying figures, one skilled in the art can obtain other figures without making any creative effort.

DETAILED DESCRIPTION

In order to assist one skilled in the art to clearly understand the technical scheme, goals, characteristics and advantages of the exemplary embodiments, the technical scheme in the exemplary embodiments will be described in further detail with reference to the accompanying figures of the exemplary embodiments.

First Exemplary Embodiment

Figure 1:
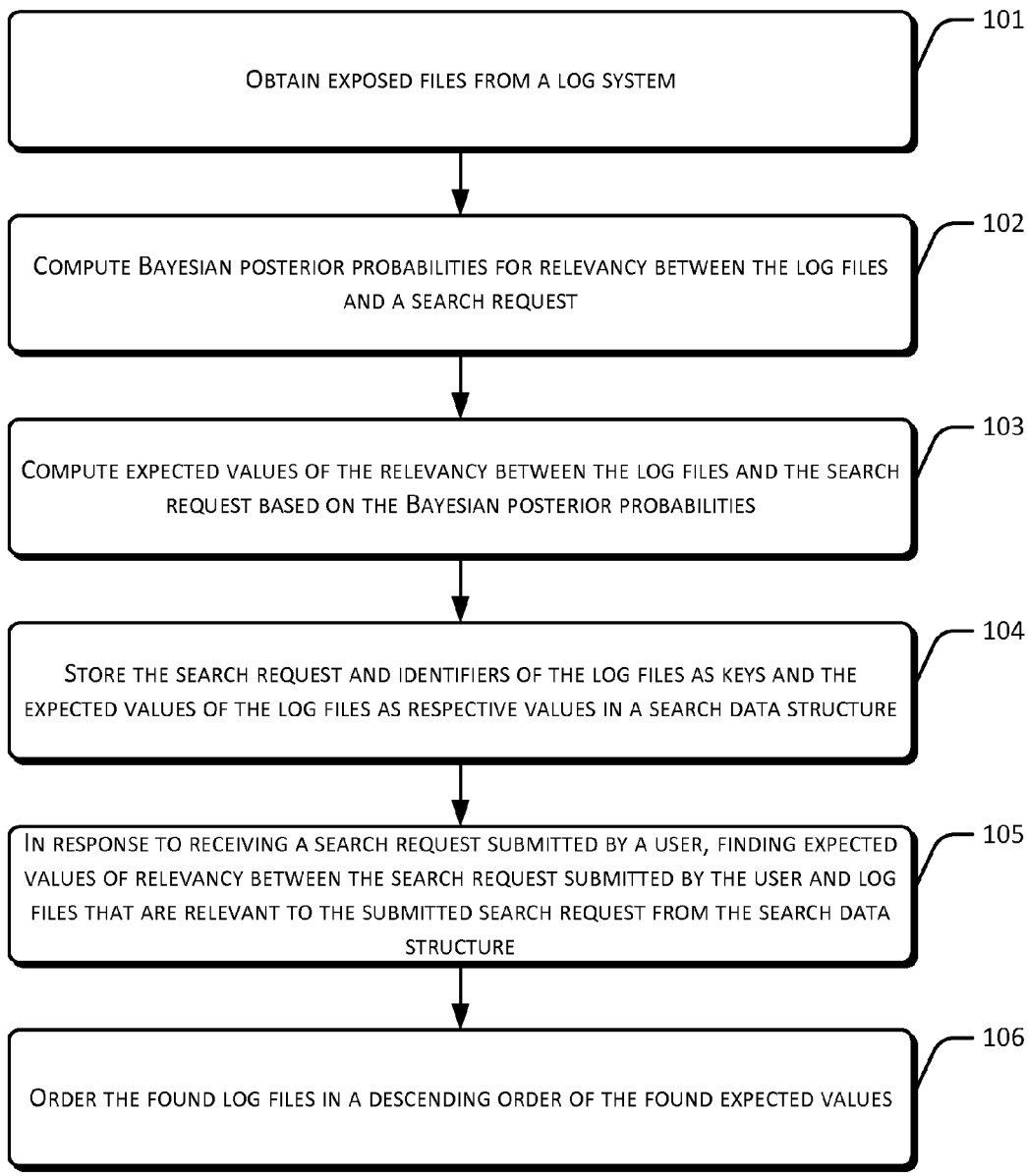
FIG. 1 shows a flow diagram illustrating an exemplary method of ordering search results.

FIG. 1 shows a flow diagram illustrating an exemplary method of ordering search results, which includes the following blocks.

At 101, the method obtains exposed log files from a log system.

The log system stores log files that have been exposed in the past and log files that are exposed on the current day using an incremental update approach. All the log files that are stored in the log system are retrieved from the log system. When a user performs a search through a search engine, search results that are relevant to corresponding search request are displayed to the user. The search results that are displayed to the user are exposed search results, which are stored in the log system in a form of log files.

At 102, the method computes Bayesian posterior probabilities of relevancy between log files and a search request.

During the study, the inventors of this patent application have noted that the degree of relevancy between a piece of information and a user's search request is often related to the position of that piece of information in a search result list and a click sequence associated with the search result list. For example, when a search result page is shown to a user, the user typically browses displayed information of log files that is displayed in a web page from top to bottom, and clicks on displayed information of a log file to read corresponding content if the displayed information of the log file fulfills his/her intention of search. After reading the content of that displayed information, the user may continue to browse displayed information of log files following thereafter, or stop browsing if his/her desired content has been found. Therefore, whether a user clicks on a certain log file depends on whether he has seen that log file, and further depends on the degree of relevancy between that log file and the user's search request. Furthermore, whether the user continues to browse a subsequent log file depends on clicking situations of log files that are prior to that subsequent log file.

Figure 2:
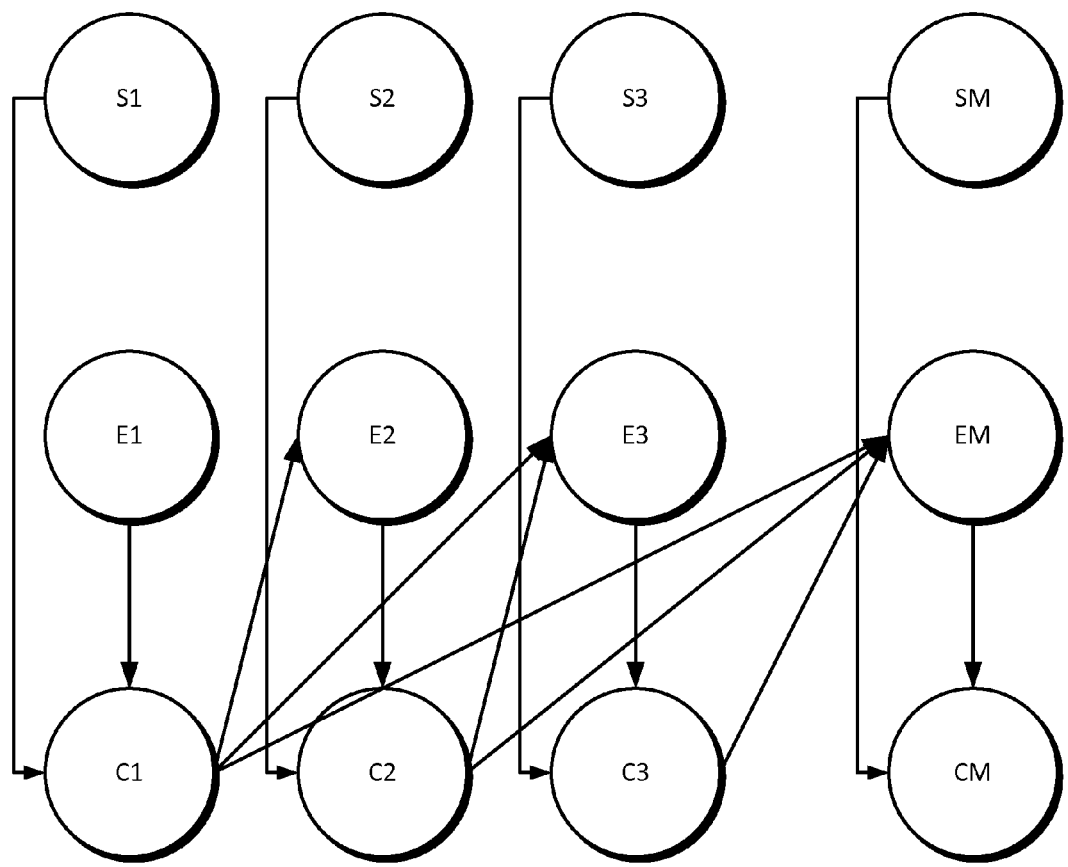
FIG. 2 shows a schematic diagram illustrating a structure of a probability model constructed in accordance with the present disclosure.

Based on the above situations, a mathematical model is constructed. FIG. 2 shows a schematic diagram of a structure of a probability model constructed in accordance with the present disclosure. In FIG. 2, each node represents a random variable. S represents relevancy between a log file and a search request of a user. E represents whether the user has seen the log file. C represents whether the user has clicked on the log file. A subscript represents the position of the log file displayed in a search result page, and M represents the total number of log files in the search result page. Based on the aforementioned analysis, whether a user clicks on a certain log file is related to whether the user has seen the log file and a degree of relevancy between the log file and the user's search request. Further, whether the user continues to browse a subsequent log file is related to clicking situations of previous log files. For example, from the model in FIG. 2, S1 and E1 are separately directing towards C1, indicating that whether the user clicks on a log file C1 is related to whether the user has seen a log file E1 and a degree of relevancy S1 between that log file and the user's search request. Further, C1 is directing towards E2, indicating that whether the user continues to browse a subsequent log file E2 is related to a clicking situation of the log file C1.

Based on the probability inference of the mathematical model shown in FIG. 2, under the circumstance that a prior distribution follows a uniform distribution over [0, 1], with 0 and 1 representing the two end points of a real value interval (i.e., a prior distribution of a relevancy variable is uniformly distributed between 0 and 1 of a real value interval), and that a user has clicked on log files C1, C2 . . . CN, a formula for computing a joint posterior distribution of relevancy between the log files and a search request is:

$$p(R \mid c^{1:N}) = \frac{1}{z} \prod_{j=1}^{N} R_j^{N_j} \prod_{(r,d) \in T} (1 - \beta_{r,d} R_j)^{\tilde{N}_{j,r,d}}$$

In the above formula, $R_j$ represents a random relevancy variable for a log file j and a user search request. $N_j$ represents the total number of times that the log file j is clicked. $\tilde{N}_{j,r,d}$ represents the number of occurrences for a situation when the log file j is located at position r+d and is not clicked, a log file located at position r is clicked, and log files located at positions between r and r+d are not clicked. T represents all possible values between (r, d). $\beta_{r,d}$ is a global parameter. N represents the total number of log files retrieved from the log system. z represents a normalization coefficient.

From the above form of joint distribution, the joint distribution may be decomposed as a multiplicative product of distributions of individual files. Therefore, a formula for computing a posterior distribution of relevancy for a single document j is:

$$p(R_j \mid c^{1:N}) = \frac{1}{z} R_j^{N_j} \prod_{0 \leq r \leq M-1, 1 \leq d \leq M-r} (1 - \beta_{r,d} R_j)^{\tilde{N}_{j,r,d}}$$

-continued $$z = \int_0^1 R_j^{N_j} \prod_{0 \le r \le M-1, 1 \le d \le M-r} (1-\beta_{r,d}R_j)^{\tilde{N}_{j,r,d}} dR_j$$

$\beta_{r,d}$ is a global parameter, having an estimated value $$\hat{\beta}_{r,d} = \min\left\{1, \frac{2N_{r,d}}{N_{r,d}+\tilde{N}_{r,d}}\right\}.$$

$N_{r,d}$ is the number of occurrences for a situation when log files located at position r and r+d are clicked and log files located at positions between r and r+d are not clicked in a same click sequence including a log file j. $\tilde{N}_{r,d}$ is the number of occurrences for a situation when a log file located at position r is clicked, a log file located at position r+d is not clicked and log files located at positions between r and r+d are not clicked in the same click sequence including the log file j. The value of r is a natural number that is less than or equal to M−1, and the value of d is an integer that is less than or equal to M−r, where M represents the total number of log files in the same click sequence including the log file j. A same click sequence corresponds to a sequence that is made up of all search results obtained for a search request of a user. For example, corresponding to a user's search request "MP3", the total number of search results for that search request of the user is one hundred log files. Therefore, these one hundred log files constitute a same click sequence for "MP3".

At 103, the method computes expected values of relevancy between the log files and the search request based on the Bayesian posterior probabilities.

Based on the Bayesian posterior probabilities obtained from the previous block, expected values of relevancy between the log files and the search request are computed, where the formula for computing the expected values is:

$$E(R_j) = \int_0^1 R_j p(R_j \mid C^{1:n}) dR_j$$

It should be noted that the cost for computing an expected value is relatively large, leading to a relatively large consumption of system resources. In order to avoid an excessive consumption of system resources for computing an expected value, filtering is performed for the log files prior to computing the expected values of the relevancy for the log files at this block. Certain log files have relevancy that is neither good nor bad with the search request of the user. In an actual application, these log files for which relevancy is neither good nor bad may be filtered in order to save space and time.

Generally, relevancy between a log file and a user's search request is neither good nor bad if an expected value of the relevancy is 0.5. Therefore, log files having an expected value of relevancy with a search request less than or equal to 0.5, for example, may be filtered. The present disclosure provides an approach to filter log files for which relevancy is neither good nor bad prior to computing expected values.

Preferably, prior to computing the expected values of the relevancy between the log files and the search request based on the Bayesian posterior probabilities, the method further includes: filtering the log files based on global parameters, where log files having a respective global parameter less than a predefined threshold are filtered. Here, the global parameters refer to parameters that are not related to a user's search request, but correspond to a group of indicator parameters reflecting evaluation of a search engine by the user. In a given situation, correspondence relationships between the global parameters and the expected values of the relevancy between the log files and the search request are established through a probability distribution function. A threshold-based filtering for expected values is equivalent to a threshold-based filtering for global parameters. The derivation of such relationship needs to be analyzed in advance, and a threshold for the global parameter is computed based on a threshold for expected value in the initial phase of the system. As such, filtering may be performed using the global parameters in the log processing phase.

For example, log files that have been exposed once but were not clicked are selected from the exposed log files. Among the selected log files, log files having a respective global parameter less than a predefined threshold according to a filtering criteria formula $$\beta_{r,d} < \frac{1/E_{th}}{\frac{1}{3}/\frac{1}{2}E_{th}}$$

are filtered, where $\beta_{r,d}$ is a global parameter.

$$\hat{\beta}_{r,d} = \min\left\{1, \frac{2N_{r,d}}{N_{r,d}+\tilde{N}_{r,d}}\right\}.$$

$N_{r,d}$ is the number of occurrences for a situation when log files located at position r and r+d are clicked and log files located at positions between r and r+d are not clicked in a same click sequence including the selected log files. For the sake of description, an example of a click sequence including five log files is used for illustration. Log files located at first, third and fifth positions have been clicked whereas log files located at second and fourth positions have not been clicked. Specifically, the number of occurrences is one for a situation when the log files located at the first and the third positions have been clicked and the log file located between the second and the fourth positions (i.e., the log file located at the second position) has not been clicked. Further, the number of occurrences is one for a situation when the log files located at the third and the fifth positions have been clicked and the log file located between the third and the fifth positions (i.e., the log file located at the fourth position) has not been clicked. Therefore, $N_{r,d}$ is two according to the above click sequence.

$\tilde{N}_{r,d}$ is the number of occurrences for a situation when a log file located at position r is clicked, a log file located at position r+d is not clicked and log files located at positions between r and r+d are not clicked in the same click sequence including the selected log files. The value of r is a natural number that is less than or equal to M−1, and the value of d is an integer that is less than or equal to M−r, where M represents the total number of log files in the same click sequence including the selected log files. $E_{th}$ is a predefined threshold value corresponding to an expected value of relevancy between a log file and a search request.

It should be noted that $E_{th}$ is a predefined threshold value corresponding to an expected value of relevancy between a log file and a search request. Generally, a threshold is defined for an expected value of relevancy between a log file and a search request. If the threshold is set as 0.5, for example, log files having an expected value of relevancy to be 0.5 may be filtered. Understandably, the predefined threshold for the expected value of relevancy may be set according to usage needs and application scenarios of users. The present disclosure has no limitation thereon.

Upon filtering the log files, expected values of the filtered log files are computed in this block.

Furthermore, after computing the expected values of the relevancy between the log files and the search request and before storing the expected values of the relevancy between the log files and the search request as values in a search data structure, a further filtering may be performed for the log files. This ensures that the log files that are stored in the search data structure have higher relevancy with the search request after two filtering operations. Therefore, the search engine can quickly find log files and respective expected values that are relevant to a search request submitted by a user from the search data structure. Furthermore, since the expected values of the relevancy between the log files and the search request have been computed, filtering can be directly performed through the expected values of the relevancy between the log files and the search request. Specifically, if an expected value of relevancy between a log file and a search request is less than or equal to a predefined value, that log file is filtered.

Furthermore, variances of relevancy between the log files and the search request may be computed based on the Bayesian posterior probabilities, and may be directly used for filtering, i.e., filtering a log file if a variance of relevancy between the log file and the search request is less than or equal to a predefined value.

The formula for computing the variance is:

$$D(R_j) = \int_0^1 (R_j - E(R_j))^2 p(R_j | C^{1:n}) dR_j.$$

It should further be noted that a predefined threshold corresponding to an expected value or variance of relevancy between a log file and a search request may be set based on usage needs and application scenarios of users. The present disclosure does not have any limitation thereon.

At 104, the method stores the search request and identifiers of the log files as keys, and respective expected values of the relevancy between the log files and the search request as values in a search data structure.

For example, key=continuous memory blocks that are occupied by a search request and an identifier of a log file, where a character in the search request occupies one memory byte, and the identifier of the log file is represented by four memory bytes. value=memory occupied by the integral part of a multiplicative product of a respective expected value and multiplied by 10000. Indexing for the keys and the values in the search data structure may be established using the commonly used trie tree, and will not be described in further detail in this exemplary embodiment herein.

Preferably, in order to ensure the accuracy of the search data structure, after storing the search request and the identifiers of the log files as the keys, and respective expected values of the relevancy between the log files and the search request as the values in the search data structure, the method further includes: validating the search data structure. Finding expected values of relevancy between a search request submitted by a user and all log files that are relevant to the submitted search request from the search data structure includes: finding the expected values of relevancy between the search request submitted by the user and all the log files that are relevant to the submitted search request from the validated search data structure.

Upon using the keys in the search data structure as input data for a search engine to search the search data structure, validation is passed if output results are corresponding values of the keys that are used as the input data. For example, the search data structure includes a group of key-value pairs. Sections of the keys in the key-value pairs that correspond to a search request are "MP3", and sections of the keys in the key-value pairs that correspond to identifiers of log files are ID1, ID2, and ID3 respectively. Values in the key-value pairs that correspond to expected values of relevancy between the log files and the search request are 0.5, 0.8 and 0.7 respectively. "MP3 and ID1", "MP3 and ID2" and "MP3 and ID3" are separately used as input data. After searching the search data structure through a search engine, validation is passed if respective output results are 0.5, 0.8, and 0.7. Otherwise, validation is failed.

All the keys in the search data structure are validated one by one using the above approach. The search data structure passes the validation if all the keys are successfully validated.

At 105, the method finds expected values of relevancy between a search request submitted by a user and all log files that are relevant to the submitted search request from the search data structure in response to receiving the search request submitted by the user.

At 106, the method orders the found log files in a descending order of the found expected values.

From the above exemplary embodiment, the disclosed method computes expected values of relevancy between log files and search requests based on Bayesian posterior probabilities, and in response to finding expected values of relevancy between a search request submitted by a user and log files that are relevant to the submitted search request from a search data structure, orders the found log files in a descending order of the found expected values. By taking into account the factors about positions of the information and a click sequence, users can obtain the most desired information quickly, thus reducing the cost of a search process for a search engine server and saving system resources of the search engine server.

Second Exemplary Embodiment

Figure 3:
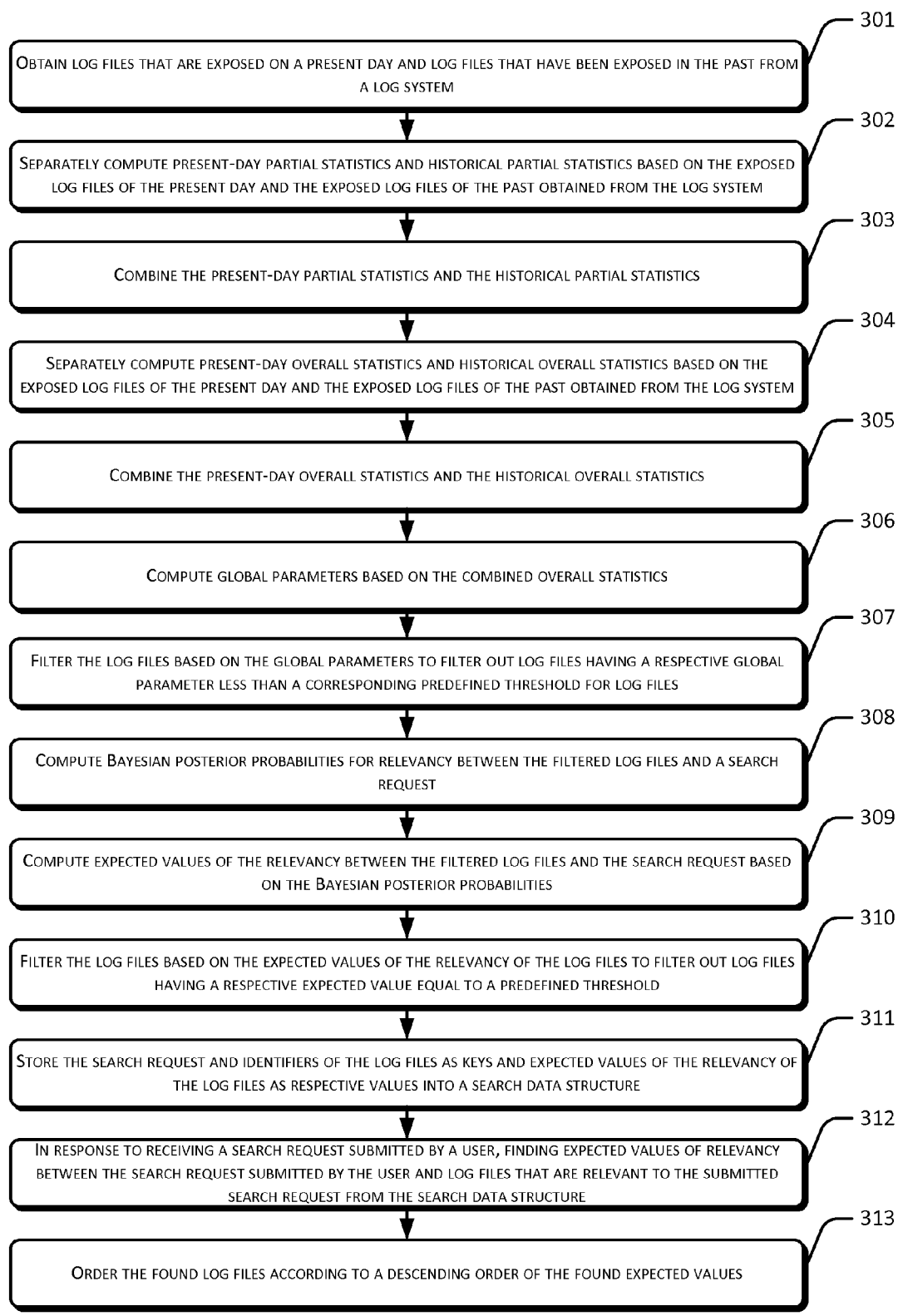
FIG. 3 shows a flow diagram illustrating another exemplary method of ordering search results.

Another embodiment of a method of ordering search results will be described in detail as follows. FIG. 3 shows a flow diagram illustrating another exemplary method of ordering search results. The method includes the following blocks.

At 301, the method obtains log files that are exposed on the present day and log files that were exposed in the past from a log system.

Log files that are exposed on the present day and log files that were exposed in the past within certain time intervals may be separately kept. For example, log files within a sliding time window may be kept as a backup copy, and may be used for investigating problems and recovering data if abnormality occurs in the course of system operations.

At 302, the method computes present-day partial statistics and historical partial statistics based on the log files that are exposed on the present day and the log files that were exposed in the past respectively from the log system.

The partial statistics include $N_j$ and $\tilde{N}_{j,r,d}$. $N_j$ represents the total number of times that a log file j has been clicked. $\tilde{N}_{j,r,d}$ represents the number of occurrences for a situation when the log file j located at position r+d is clicked, a log file located at position r is clicked and log files located at positions between r and r+d are not clicked. T represents all the possible values between (r, d).

At 303, the method combines the present-day partial statistics and the historical partial statistics.

The present-day partial statistics and the historical partial statistics within certain time intervals may be separately kept to support incremental update, to investigate problems that may occur during operation, and for data recovery.

At 304, the method computes present-day overall statistics and historical overall statistics based on the log files that are exposed on the present day and the log files that were exposed in the past respectively from the log system.

The overall statistics include $N_{r,d}$ and $\tilde{N}_{r,d}$. $N_{r,d}$ is the number of occurrences for a situation when log files located at position r and r+d are clicked and log files located at positions between r and r+d are not clicked in a same click sequence including a log file j. $\tilde{N}_{r,d}$ is the number of occurrences for a situation when a log file located at position r is clicked, a log file located at position r+d is not clicked and log files located at positions between r and r+d are not clicked in the same click sequence including the log file j. The value of r is a natural number that is less than or equal to M−1, and the value of d is an integer that is less than or equal to M−r, where M represents the total number of log files in the same click sequence including the log file j.

At 305, the method combines the present-day overall statistics and the historical overall statistics.

The present-day overall statistics and the historical overall statistics within certain time intervals may be separately kept to support incremental update, to investigate problems that may occur during operation, and for data recovery.

At 306, the method computes global parameters based on the combined overall statistics.

The global parameters are $\hat{\beta}_{r,d}$, $$\hat{\beta}_{r,d} = \min\left\{1, \frac{2N_{r,d}}{N_{r,d} + \tilde{N}_{r,d}}\right\}.$$

At 307, the method filters the log files based on the global parameters so that a log file having a global parameter less than a corresponding predefined threshold is filtered.

At 308, the method computes Bayesian posterior probabilities for relevancy between the filtered log files and a search request.

The process of computing Bayesian posterior probabilities for relevancy between log files and a search request has been described in detail in the first exemplary embodiment, and therefore is not redundantly described herein. Related computation processes may be referenced in the first exemplary embodiment.

At 309, the method computes expected values of the relevancy between the filtered log files and the search request based on the Bayesian posterior probabilities.

The process of expected values of relevancy between log files and a search request has been described in detail in the first exemplary embodiment, and therefore is not redundantly described herein. Related computation process may be referenced in the first exemplary embodiment.

At 310, the method filters the log files based on the expected values of the relevancy between the log files and the search request so that a log file having an expected value of relevancy less than or equal to a predefined value is filtered.

At 311, the method stores the search request and identifiers of the log files as keys, and the expected values of the relevancy between the log files and the search request as respective values into a search data structure.

The search data structure may further be validated to obtain a validated search data structure.

At 312, the method finds expected values of relevancy between a search request submitted by a user and all log files that are relevant to the submitted search request from the search data structure in response to receiving the search request submitted by the user.

At 313, the method orders the found log files in a descending order of the found expected values.

Figure 4:
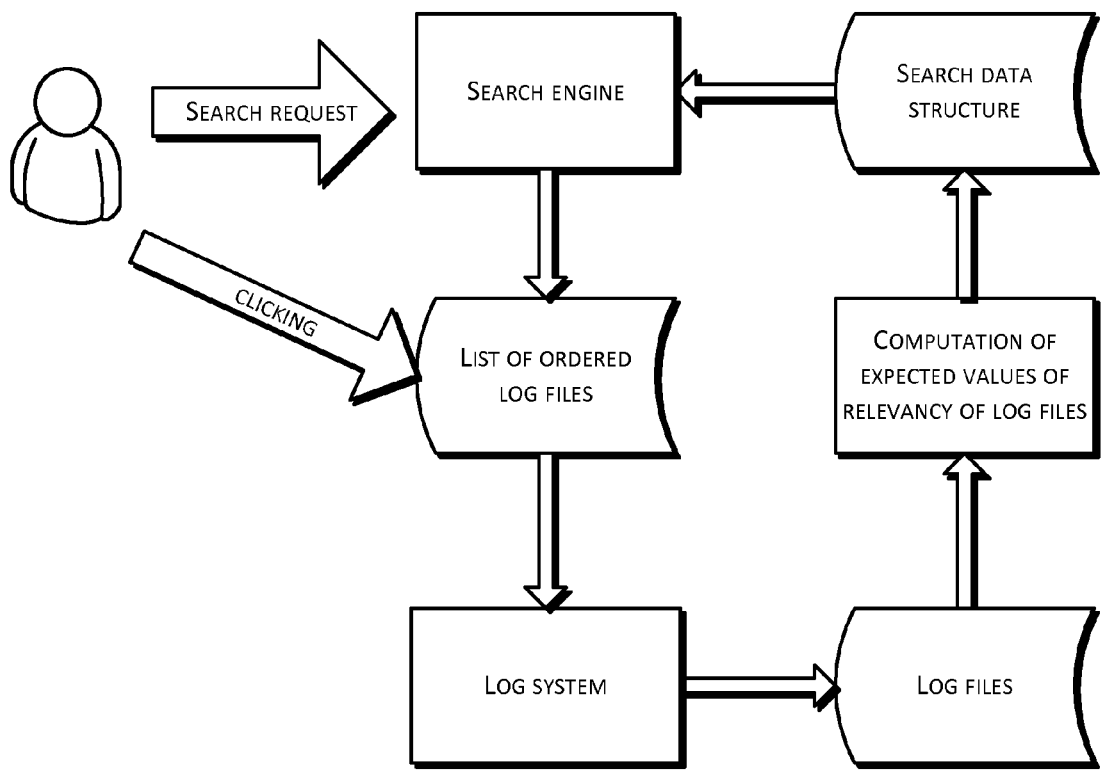
FIG. 4 shows a structural diagram illustrating a search-and-rank system.

The disclosed method of ordering search results may be applied in a search field as shown in FIG. 4, which shows a structural diagram of a search-and-rank system. Daily acquisition and incremental update of new search logs and outputting relevant index data for updating the search-and-rank system is an important factor for ranking.

Furthermore, the disclosed method of ordering search results may be applied in a ranking evaluation system. Given a search request, for example, relevancy scores of each log file with respect to the search request in a log file sequence are obtained using the disclosed method. These scores are implicit user evaluation of the sequence. A sequence of these relevancy scores may be normalized to form a probability distribution function p(x). Furthermore, an ordering method that is to be evaluated is used to compute and normalize relevancy scores of each log file in the same log file sequence to form a probability distribution function g(x). A distance between p(x) and g(x) is used as an estimate for the ordering method that is to be evaluated. The smaller the difference is, the higher the evaluation of the ordering method that is to be evaluated. The formula for computing the distance is:

$$\sum_x \frac{p(x)\log(p(x))}{g(x)}.$$

Furthermore, the disclosed method of ordering search results may be applied in a ranking training system. For example, a relevancy score for a (search, file) pair, which is represented as Y, is obtained using the disclosed method. A property (which is represented by X) of the (search, file) pair, e.g., a text property or an image property, is obtained thereafter. Subsequently, a relevancy algorithm Y=f(X) is trained using a machine learning method.

From the above exemplary embodiment, the disclosed method computes expected values of relevancy between log files and search requests based on Bayesian posterior probabilities, and in response to finding expected values of relevancy between a search request submitted by a user and log files that are relevant to the submitted search request from a search data structure, and orders the found log files in a descending order of the found expected values. By taking into account of the factors about positions of the information and a click sequence, users can obtain the most desired information quickly, thus reducing the cost of a search process for a search engine server and saving system resources of the search engine server.

Third Exemplary Embodiment

Figure 5:
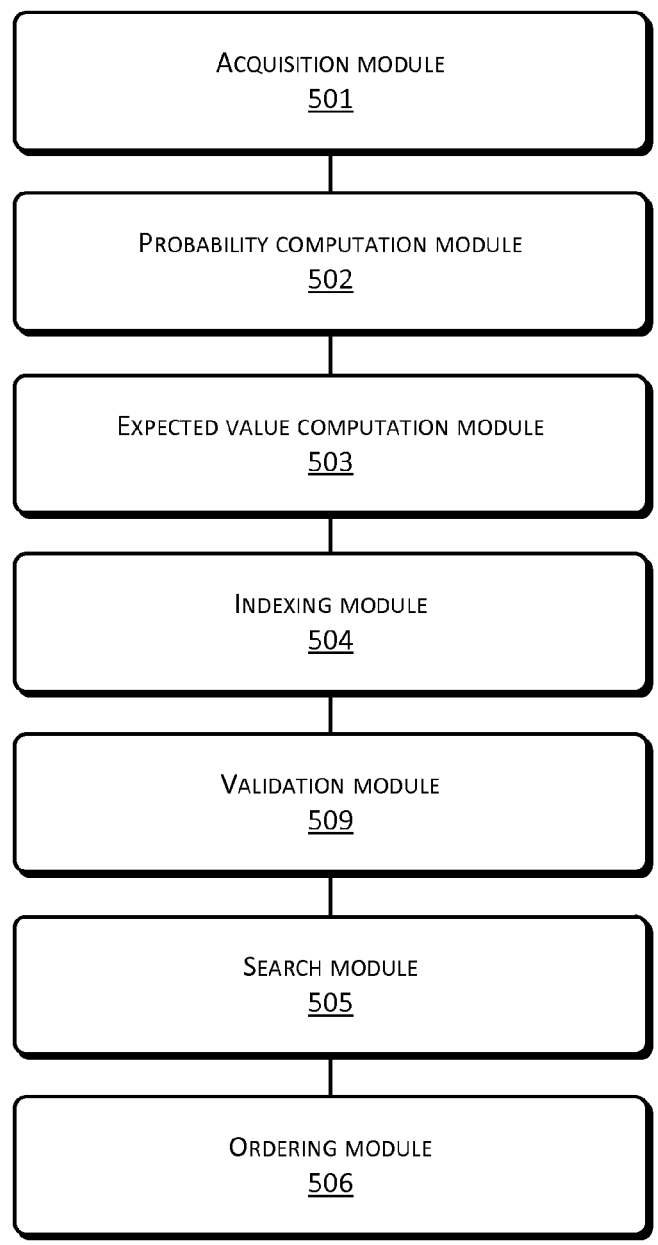
FIG. 5 shows a structural diagram illustrating an exemplary apparatus of ordering search results.

Corresponding to the above method of ordering search results, the exemplary embodiments further provide an apparatus of ordering search results. FIG. 5 shows a structural diagram illustrating an exemplary apparatus for ordering search results, which includes: an acquisition module 501, a probability computation module 502, an expected value computation module 503, an indexing module 504, a search module 505 and an ordering module 506. Internal structures and connectivity relations of the apparatus will be described using the working principles of the apparatus.

The acquisition module 501 is configured to obtain exposed log files from a log system.

The probability computation module 502 is configured to compute Bayesian posterior probabilities of relevancy between the log files and a search request.

The expected value computation module 503 is configured to compute expected values of the relevancy between the log files and the search request based on the Bayesian posterior probabilities.

The indexing module 504 is configured to store the search request and identifiers of the log files as keys and the expected values of the relevancy between the log files and the search request as respective values into a search data structure.

The search module 505 is configured to find expected values of relevancy between a search request submitted by a user and log files that are relevant to the submitted search request from the search data structure in response to receiving the search request submitted by the user.

The ordering module 506 is configured to order the found log files according to a descending order of the found expected values.

Figure 6:
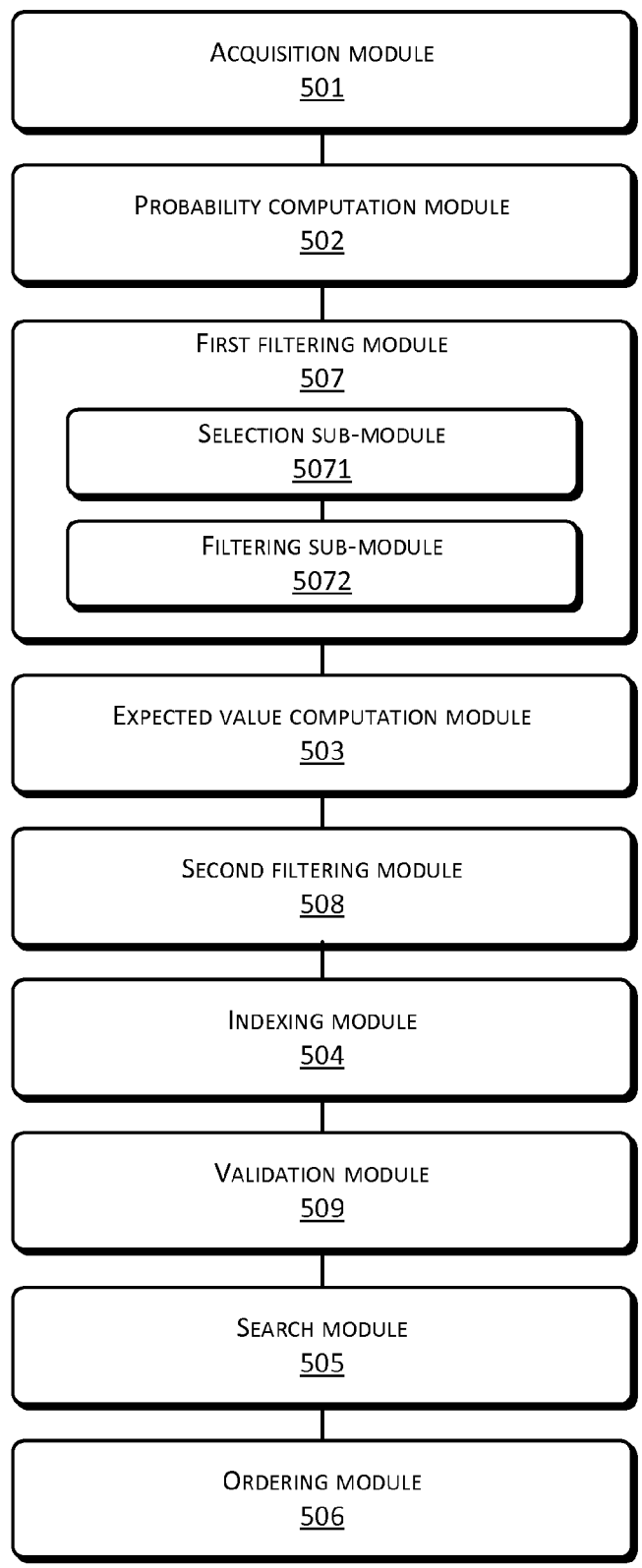
FIG. 6 shows a structural diagram illustrating another exemplary apparatus of ordering search results.

Preferably, FIG. 6 shows a structural diagram illustrating another exemplary apparatus of ordering search results. Besides the acquisition module 501, the probability computation module 502, the expected value computation module 503, the indexing module 504, the search module 505 and the ordering module 506, the apparatus further includes: a first filtering module 507 configured to filter the log files based on global parameters prior to computing the expected values of the relevancy between the log files and the search request based on the Bayesian posterior probabilities, where a log file having a global parameter less than a corresponding predefined threshold is filtered, and where the expected value computation module 503 is configured to compute the expected values of the relevancy between the filtered log files and the search request based on the Bayesian posterior probabilities.

The first filtering module 507 further includes: a selection sub-module 5071 and a filtering sub-module 5072.

The selection sub-module 5071 is configured to select log files that have been exposed once and have not been clicked from the exposed log files.

The filtering sub-module 5072 is configured to filter the log file having the global parameter less than the corresponding predefined threshold value for log files from the selected log files according to a filtering criteria formula $$\beta_{r,d} < \frac{1/E_{th}}{\frac{1}{3} / \frac{1}{2} E_{th}},$$

where $\beta_{r,d}$ is the global parameter, $$\hat{\beta}_{r,d} = \min\left\{1, \frac{2N_{r,d}}{N_{r,d} + \tilde{N}_{r,d}}\right\},$$

$N_{r,d}$ is the number of occurrences of a situation when log files located at position r and r+d are clicked and log files located at positions between r and r+d are not clicked in a same click sequence including the selected log files. $\tilde{N}_{r,d}$ is the number of occurrences for a situation when a log file located at position r is clicked, a log file located at position r+d is not clicked and log files located at positions between r and r+d are not clicked in the same click sequence including the selected log files. The value of r is a natural number that is less than or equal to M−1, and the value of d is an integer that is less than or equal to M−r, where M represents the total number of log files in the same click sequence including the selected log files. $E_{th}$ is a predefined threshold value corresponding to an expected value of relevancy.

Figure 7:
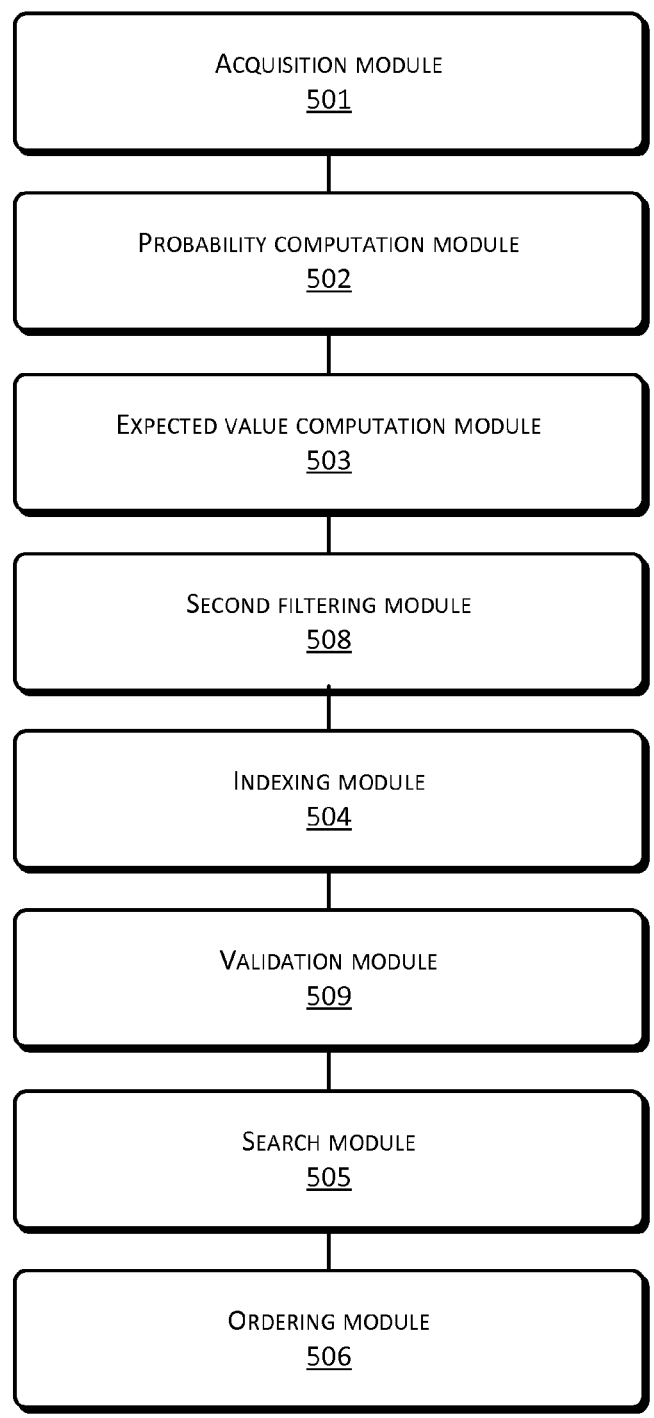
FIG. 7 shows a structural diagram illustrating still another exemplary apparatus of ordering search results.

FIG. 7 shows a structural diagram illustrating still another exemplary apparatus of ordering search results. The apparatus further includes: a second filtering module 508 configured to filter the log files based on the expected values or variances of the relevancy between the log files and the search request prior to storing the search request and the identifiers of the log files as the keys and the expected values of the log files as respective values into the search data structure, where a log file having an expected value or a variance less than a corresponding predefined threshold is filtered, and where the indexing module 504 is configured to store the search request and the identifiers of the filtered log files as the keys and the expected values of the filtered log files as respective values into the search data structure.

Figure 8:
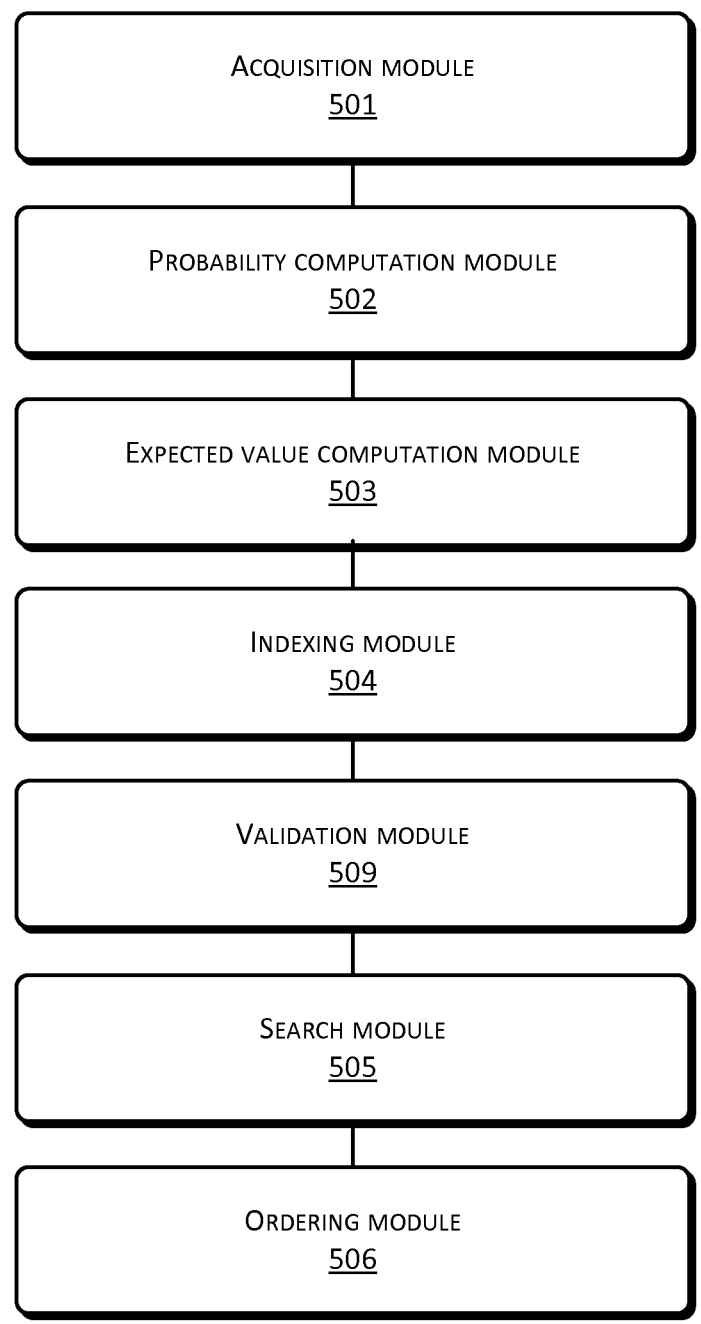
FIG. 8 shows a structural diagram illustrating still another exemplary apparatus of ordering search results.

FIG. 8 shows a structural diagram of still another exemplary apparatus of ordering search results. Besides the acquisition module 501, the probability computation module 502, the expected value computation module 503, the indexing module 504, the search module 505 and the ordering module 506, the apparatus further includes: a validation module 509 configured to validate the search data structure prior to storing the search request and the identifiers of the log files as the keys and the expected values of the log files as respective values into the search data structure, where the search module 505 is configured to find the expected values of the relevancy between the search request submitted by the user and the log files that are relevant to the submitted search request from the validated search data structure.

From the above exemplary embodiments, the disclosed apparatuses compute expected values of relevancy between log files and search requests based on Bayesian posterior probabilities, and in response to finding expected values of relevancy between a search request submitted by a user and log files that are relevant to the submitted search request from a search data structure, and order the found log files in a descending order of the found expected values. By taking into account of the factors about positions of the information and a click sequence, users can obtain the most desired information quickly, thus reducing the cost of a search process for a search engine server and saving up system resources of the search engine server.

Alternative Embodiments

Although the above embodiments describe using Bayesian posterior probability to compute expected values of relevancy and order search results based on these expected values of relevancy, the present disclosure is not limited thereto. By way of example and not limitation, the disclosed method and apparatus may employ any other mathematical model such as a linear combination of the factors described in the foregoing embodiments, e.g., number of clicks for the log file, etc., to determine an expected value of relevancy between a log file and a search request. It should be noted that one of ordinary skills in the art can understand all or part of the process in the above exemplary methods may be achieved by instructing hardware through a computer program. The program may be stored in computer-readable storage media. During execution, the program may include a process of any of the above exemplary embodiments. The storage media may include a magnetic disk, an optical disk, Read-Only Memory (ROM), or Random Access Memory (RAM), etc.

Figure 9:
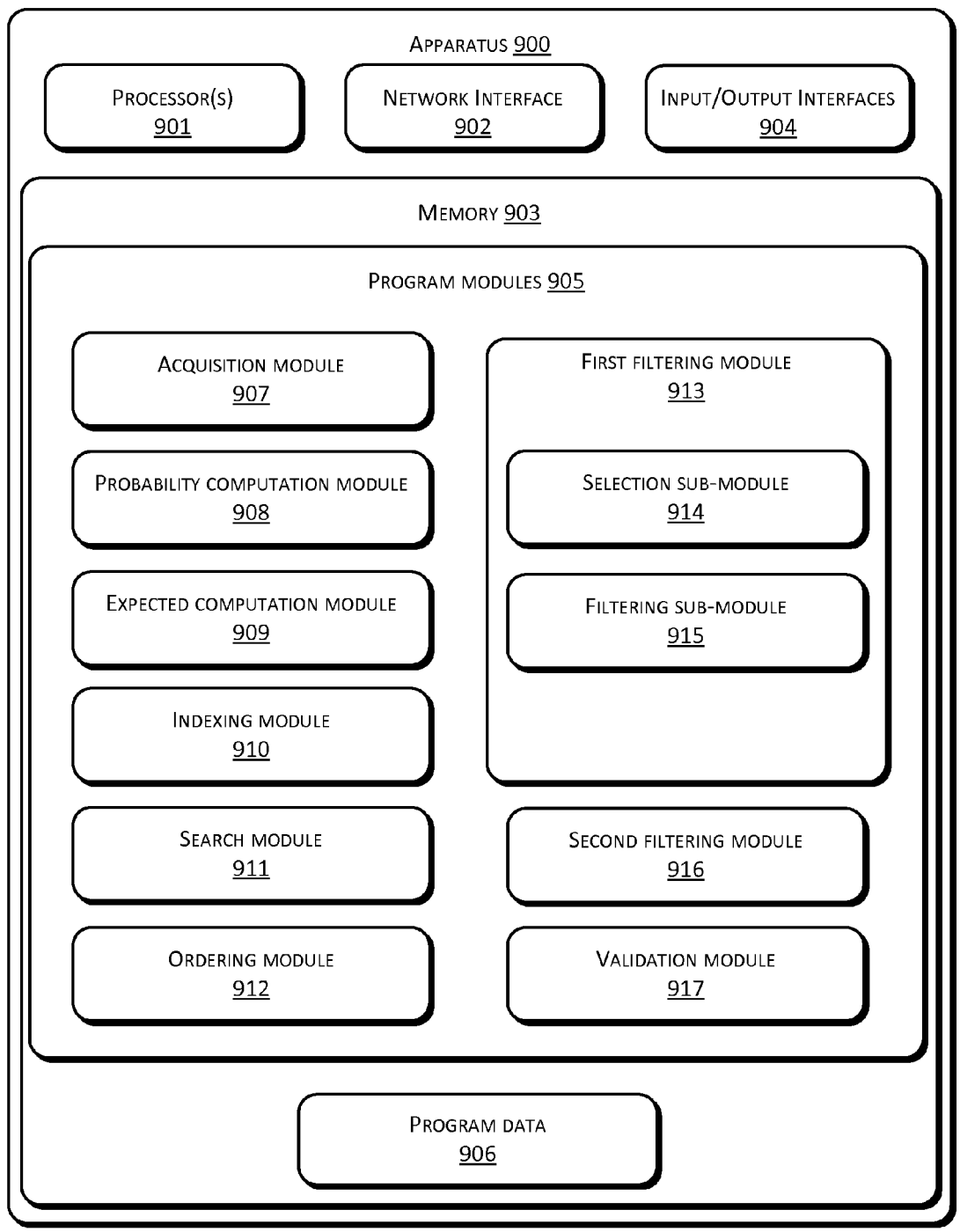
FIG. 9 shows additional details of an exemplary apparatus, such as those described in FIGS. 5-8.

For example, FIG. 9 illustrates an exemplary system 900 showing additional details of an apparatus, such as the apparatuses of FIG. 508. In one embodiment, the system 900 can include, but is not limited to, one or more processors 901, a network interface 902, memory 903, and an input/output interface 904.

The memory 903 may include computer-readable media in the form of volatile memory, such as RAM and/or non-volatile memory, such as ROM or flash RAM. The memory 903 is an example of computer-readable storage media.

Computer-readable media includes volatile and non-volatile, removable and non-removable media implemented in any method or technology for storage of information such as computer readable instructions, data structures, program modules, or other data. Examples of computer storage media includes, but is not limited to, phase change memory (PRAM), static random-access memory (SRAM), dynamic random-access memory (DRAM), other types of RAM, ROM, electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable storage media does not include transitory media such as modulated data signals and carrier waves.

The memory 903 may include program modules 905 and program data 906. In one embodiment, the program modules 905 may include an acquisition module 907, a probability computation module 908, an expected value computation module 909, an indexing module 910, a search module 911 and an ordering module 912. Additionally, in some embodiments, the program modules 905 may further include a first filtering module 913. In some embodiments, the first filtering module 913 may include a selection sub-module 914 and a filtering sub-module 915. Additionally or alternatively, the program modules 905 may further include a second filtering module 916. Additionally or alternatively, in some embodiments, the program modules 905 may further include a validation module 917. Details about these program modules may be found in the foregoing embodiments described above.

The methods and apparatuses of ordering search results have been described in the present disclosure in detail. Exemplary embodiments are employed to illustrate the concept and implementation of the present invention in this disclosure. The exemplary embodiments are only used for better understanding of the method and the core concepts of the present invention. Based on the concepts in this disclosure, one of ordinary skills in the art may modify the exemplary embodiments and application fields. All in all, contents in the present disclosure should not be construed as limitations to the disclosed methods and apparatuses.

What is claimed is:

1. A method of ordering search results, comprising:
    obtaining exposed log files from a log system;
    computing Bayesian posterior probabilities for relevancy between the log files and a search request;
    computing expected values of the relevancy between the log files and the search request;
    filtering the log files based at least in part on the expected values or variances of the relevancy between the log files and the search request to filter out a log file having a respective expected value or variance less than or equal to a predefined threshold;
    after filtering the log files, storing the search request and identifiers of the filtered log files as keys and the expected values of the relevancy between the filtered log files and the search request as respective values into a search data structure;
    in response to receiving a search request submitted by a user, finding expected values of relevancy between the search request submitted by the user and log files that are relevant to the submitted search request from the search data structure; and
    ordering the relevant log files according to a descending order of the found expected values.

2. The method as recited in claim 1, wherein prior to computing the Bayesian posterior probabilities, the method further comprises filtering the exposed log files based on global parameters to filter out a log file having a respective global parameter less than a predetermined threshold, wherein computing the Bayesian posterior probabilities comprises computing Bayesian posterior probabilities for relevancy between the search request and exposed log files that remain after the filtering based on the global parameters.

3. The method as recited in claim 2, wherein filtering the exposed log files based on the global parameters comprises:
    selecting log files that have been exposed once and have not been clicked from the exposed log files; and
    filtering, from the selected log files, log file having the respective global parameter less than the predetermined threshold according to a filtering criteria formula $$\beta_{r,d} < \frac{1/E_{th}}{\frac{1}{3} / \frac{1}{2} E_{th}},$$

wherein $\beta_{r,d}$ is a global parameter, $$\hat{\beta}_{r,d} = \min\left\{1, \frac{2N_{r,d}}{N_{r,d} + \tilde{N}_{r,d}}\right\},$$

$N_{r,d}$ is the number of occurrences for a situation when log files located at position r and r+d are clicked and log files located at positions between r and r+d are not clicked in a same click sequence including the selected log files, $\tilde{N}_{r,d}$ is the number of occurrences for a situation when a log file located at position r is clicked, a log file located at position r+d is not clicked and log files located at positions between r and r+d are not clicked in the same click sequence including the selected log files, a value of r is a natural number that is less than or equal to M−1, and a value of d is an integer that is less than or equal to M−r, M representing the total number of log files in the same click sequence including the selected log files, and $E_{th}$ is a predefined threshold value corresponding to an expected value of relevancy between a log file and a search request.

4. The method as recited in claim 1, further comprising, after the storing, validating the search data structure, wherein the finding comprises finding the expected values of the relevancy between the search request submitted by the user and the log files that are relevant to the submitted search request from the validated search data structure.

5. The method as recited in claim 1, wherein computing the Bayesian posterior probabilities comprises:

based on whether the user has clicked a log file, whether the user has seen the log file, a degree of relevancy between the log file and the search request of the user, whether the user has browsed subsequent log files and clicking conditions of previous log files, and/or if a prior distribution follows a uniform distribution over [0, 1], computing a joint posterior distribution for relevancy between the log file and the request after the user clicks the log file.

6. An apparatus of ordering search results, comprising:

an acquisition module configured to obtain exposed log files from a log system;

a probability computation module configured to compute Bayesian posterior probabilities of relevancy between the log files and a search request;

an expected value computation module configured to compute expected values of the relevancy between the log files and the search request based on the Bayesian posterior probabilities;

a first filtering module configured to filter the log files based on the expected values or variances of the relevancy between the log files and the search request, wherein a log file having an expected value or a variance less than a corresponding predefined threshold is filtered;

an indexing module configured to store, after filtering the log files by the first filtering module, the search request and identifiers of the filtered log files as keys and the expected values of the relevancy between the filtered log files and the search request as respective values into a search data structure;

a search module configured to find expected values of relevancy between a search request submitted by a user and log files that are relevant to the submitted search request from the search data structure in response to receiving the search request submitted by the user; and an ordering module configured to order the relevant log files according to a descending order of the found expected values.

7. The apparatus as recited in claim 6, further comprising a second filtering module configured to filter the exposed log files based on global parameters prior to computing the expected values of the relevancy between the exposed log files and the search request based on the Bayesian posterior probabilities, wherein a log file having a global parameter less than a corresponding predetermined threshold is filtered, and wherein the expected value computation module is further configured to compute expected values of the relevancy between the search request and exposed log files that remain after the filtering based on the global parameters.

8. The apparatus as recited in claim 7, wherein the second filtering module comprises:

a selection sub-module configured to select log files that have been exposed once and have not been clicked from the exposed log files; and a filtering sub-module configured to filter the log file having the global parameter less than the corresponding predetermined threshold for log files from the selected log files according to a filtering criteria formula $$\beta_{r,d} < \frac{1/E_{th}}{\frac{1}{3} / \frac{1}{2} E_{th}},$$

wherein $\beta_{r,d}$ is the global parameter, $$\hat{\beta}_{r,d} = \min\left\{1, \frac{2N_{r,d}}{N_{r,d} + \tilde{N}_{r,d}}\right\},$$

$N_{r,d}$ is the number of occurrences for a situation when log files located at position r and r+d are clicked and log files located at positions between r and r+d are not clicked in a same click sequence including the selected log files, $\tilde{N}_{r,d}$ is the number of occurrences for a situation when a log file located at position r is clicked, a log file located at position r+d is not clicked and log files located at positions between r and r+d are not clicked in the same click sequence including the selected log files, a value of r is a natural number that is less than or equal to M−1, and a value of d is an integer that is less than or equal to M−r, M representing the total number of log files in the same click sequence including the selected log files and $E_{th}$ is a predefined threshold value corresponding to an expected value of relevancy.

9. The apparatus as recited in claim 6, further comprising a validation module configured to validate the search data structure prior to storing the search request and the identifiers of the filtered log files as the keys and the expected values of the filtered log files as respective values into the search data structure, wherein the search module is further configured to find the expected values of the relevancy between the search request submitted by the user and the log files that are relevant to the submitted search request from the validated search data structure.

10. The apparatus as recited in claim 6, wherein the probability computation module is configured to compute a Bayesian posterior probability between a log file of the log files and the search request based on whether the user has clicked the log file, whether the user has seen the log file, a degree of relevancy between the log file and the search request of the user, whether the user has browsed subsequent log files and/or clicking conditions of previous log files.

11. The apparatus as recited in claim 6, wherein the indexing module employs a trie tree to store the search request and the identifiers of the filtered log files as the keys and the expected values of the relevancy between the filtered log files and the search request as respective values into the search data structure.

12. One or more storage media storing computer-executable instructions that, when executed by one or more processors, cause the one or more processors to perform acts comprising:

obtaining exposed log files from a log system;

computing Bayesian posterior probabilities for relevancy between the log files and a search request;

computing expected values of the relevancy between the log files and the search request;

filtering the log files based at least in part on the expected values or variances of the relevancy between the log files and the search request to filter out a log file having a respective expected value or variance less than or equal to a predefined threshold;

after filtering the log files, storing the search request and identifiers of the filtered log files as keys and the expected values of the relevancy between the filtered log files and the search request as respective values into a search data structure;

in response to receiving a search request submitted by a user, finding expected values of relevancy between the search request submitted by the user and log files that are relevant to the submitted search request from the search data structure; and ordering the relevant log files according to a descending order of the found expected values.

13. The one or more storage media as recited in claim 12, wherein prior to computing the Bayesian posterior probabilities, the method further comprises filtering the exposed log files based on global parameters to filter out a log file having a respective global parameter less than a predetermined threshold, wherein computing the Bayesian posterior probabilities comprises computing Bayesian posterior probabilities for relevancy between the search request and log files that remain after the filtering based on the global parameters.

14. The one or more storage media as recited in claim 13, wherein filtering the exposed log files based on the global parameters comprises:

selecting log files that have been exposed once and have not been clicked from the exposed log files; and filtering, from the selected log files, the log file having the respective global parameter less than the predetermined threshold according to a filtering criteria formula $$\beta_{r,d} < \frac{1/E_{th}}{\frac{1}{3} / \frac{1}{2} E_{th}},$$

wherein $\beta_{r,d}$ is a global parameter, $$\hat{\beta}_{r,d} = \min\left\{1, \frac{2N_{r,d}}{N_{r,d} + \tilde{N}_{r,d}}\right\},$$

$N_{r,d}$ is the number of occurrences for a situation when log files located at position r and r+d are clicked and log files located at positions between r and r+d are not clicked in a same click sequence including the selected log files, $\tilde{N}_{r,d}$ is the number of occurrences for a situation when a log file located at position r is clicked, a log file located at position r+d is not clicked and log files located at positions between r and r+d are not clicked in the same click sequence including the selected log files, a value of r is a natural number that is less than or equal to M−1, and a value of d is an integer that is less than or equal to M−r, M representing the total number of log files in the same click sequence including the selected log files, and $E_{th}$ is a predefined threshold value corresponding to an expected value of relevancy between a log file and a search request.

15. The one or more storage media as recited in claim 12, the acts further comprising, after the storing, validating the search data structure, wherein the finding comprises finding the expected values of the relevancy between the search request submitted by the user and the log files that are relevant to the submitted search request from the validated search data structure.

16. The one or more storage media as recited in claim 12, wherein computing the Bayesian posterior probabilities comprises:

based on whether the user has clicked a log file, whether the user has seen the log file, a degree of relevancy between the log file and the search request of the user, whether the user has browsed subsequent log files and clicking conditions of previous log files, and/or if a prior distribution follows a uniform distribution over [0, 1], computing a joint posterior distribution for relevancy between the log file and the request after the user clicks the log file.

* * * * *